(No Model.)

I. D. ROY.
PLOW CUTTER MECHANISM.

No. 437,721. Patented Oct. 7, 1890.

Witnesses.
A. Ruppert,
H. A. Daniels

Inventor.
Isaac D. Roy
Per
Thomas P. Simpson
Atty

UNITED STATES PATENT OFFICE.

ISAAC D. ROY, OF BONO, ARKANSAS.

PLOW-CUTTER MECHANISM.

SPECIFICATION forming part of Letters Patent No. 437,721, dated October 7, 1890.

Application filed July 11, 1890. Serial No. 358,453. (No model.)

*To all whom it may concern:*

Be it known that I, ISAAC D. ROY, a citizen of the United States, residing at Bono, in the county of Craighead and State of Arkansas, have invented certain new and useful Improvements in Plow-Cutter Mechanism; and I do hereby declare the following to be a full, clear, and exact description of the invention, such as will enable others skilled in the art to which it appertains to make and use the same.

The special object of the invention is to employ such means for holding the cutter of a plow as will admit of its easy and quick adjustment in depth and distance from the point of the plow.

Figure 1:
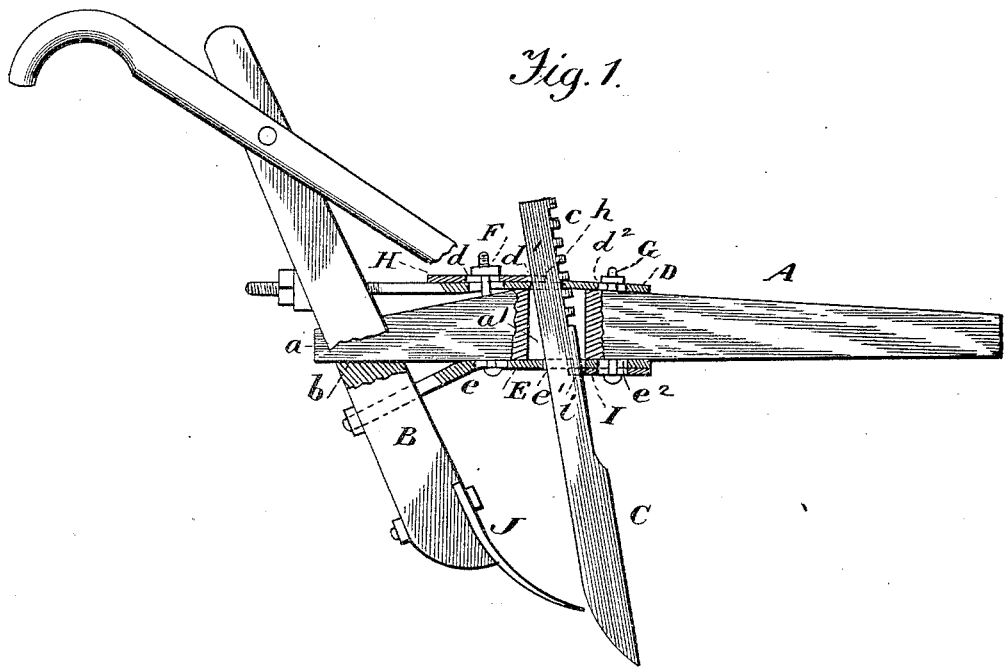
Figure 2:
Figure 3:
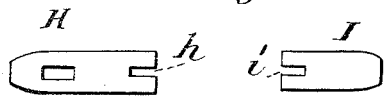

Figure 1 of the drawings is a side elevation; Fig. 2, a detail plan view of the screw-plates; Fig. 3, a similar view of the slide-plates.

In the drawings, A represents a plow-beam with the tenon $a$, which works in the mortise $b$ of the plow-standard B, so that the pitch of the plow may be adjusted and there held by the plates D E.

C is the cutter, which is notched at $c$ on the front edge, and may, if desired, be similarly notched on the rear edge.

D is the top screw-plate, and E the bottom one, both having their ends passed through the standard B and threaded to receive a nut. The top plate D has three longitudinal slots $d\ d'\ d^2$, and the bottom plate E is provided with three corresponding slots $e\ e'\ e^2$. Through the middle of the slots $d'\ e'$ and a corresponding slot $a'$ in the beam A passes the shank of the knife C, while through the beam and through the slots $d\ d^2\ e\ e^2$ pass upwardly the bolts F G, which are end-threaded to receive nuts at the top. By unscrewing and loosening the nuts the slide-plates H I, which are forked at their front ends, so as to straddle the shank of the cutter C, and slotted at $h\ i$, may move back and forth on the bolts F G and hold the cutter at the desired height. By operating the nuts on the screws of the plates D E the latter may be moved horizontally to regulate the pitch, inclination, or distance of the cutter from the point of the plow J. It will be observed that the screw-plates D E also serve as braces to hold the beam A and standard B rigidly in their true relative positions; that they do away with the old style of grass-rod and substitute something which strengthens the plow; that they also render unnecessary all wedges, bands, clamps, and set-pins.

What I claim as new, and desire to protect by Letters Patent, is—

The combination, with a beam, standard, and cutter, of the slotted screw-plates D E, the bolts F G, and the forked slotted slide-plates H I, the plates D E and bolts F G being provided with nuts, as and for the purpose set forth.

In testimony whereof I affix my signature in presence of two witnesses.

ISAAC D. ROY.

Witnesses:
T. M. SELF,
O. W. ANDERSON.